US008100143B2

(12) United States Patent
Wan et al.

(10) Patent No.: US 8,100,143 B2
(45) Date of Patent: Jan. 24, 2012

(54) MULTI-WAY VALVE WITH FAN-SHAPED FLOW CHANNEL SEALING PAIR

(75) Inventors: Mingmin Wan, Kalamayi (CN); Jianshe Yao, Kalamayi (CN)

(73) Assignee: Kelamayi King-Bull Infortec Industry Control Company, Ltd., Xinjiang (CN)

(*) Notice: Subject to any disclaimer, the term of this patent is extended or adjusted under 35 U.S.C. 154(b) by 499 days.

(21) Appl. No.: 12/311,014

(22) PCT Filed: Mar. 19, 2007

(86) PCT No.: PCT/CN2007/000888
§ 371 (c)(1),
(2), (4) Date: Mar. 17, 2009

(87) PCT Pub. No.: WO2008/071044
PCT Pub. Date: Jun. 19, 2008

(65) Prior Publication Data

US 2009/0320947 A1 Dec. 31, 2009

(30) Foreign Application Priority Data

Dec. 11, 2006 (CN) .......................... 2006 2 0167076

(51) Int. Cl.
*F16K 11/074* (2006.01)

(52) U.S. Cl. .............. 137/625.11; 137/625.46; 251/180; 251/185

(58) Field of Classification Search ............. 137/625.11, 137/625.46, 625.47; 251/180, 285
See application file for complete search history.

(56) References Cited

U.S. PATENT DOCUMENTS

| | | | | |
|---|---|---|---|---|
| 2,835,273 | A * | 5/1958 | McDonald | 137/625.11 |
| 2,996,083 | A * | 8/1961 | Huska | 137/625.11 |
| 3,433,265 | A * | 3/1969 | Bartholet | 137/625.18 |
| 4,989,641 | A * | 2/1991 | Jones et al. | 137/625.11 |
| 5,727,596 | A * | 3/1998 | Eminger | 137/876 |
| 5,927,330 | A | 7/1999 | Minton et al. | |
| 7,343,932 | B2 * | 3/2008 | Manson et al. | 137/625.11 |
| 7,343,933 | B2 * | 3/2008 | McBeth et al. | 137/625.11 |

FOREIGN PATENT DOCUMENTS

| | | |
|---|---|---|
| CN | 2279484 | 4/1998 |
| CN | 2572159 | 9/2003 |
| CN | 2709740 | 7/2005 |
| CN | 2736615 | 10/2005 |
| GB | 904299 | 8/1962 |
| JP | 11-287535 | 10/1999 |

OTHER PUBLICATIONS

International Search Report for PCT/CN2007/000888 mailed Sep. 6, 2007.

* cited by examiner

*Primary Examiner* — John Fox
(74) *Attorney, Agent, or Firm* — Nixon & Vanderhye P.C.

(57) ABSTRACT

An oil and gas collection and transmission system for petroleum, chemical industry, and so on, includes a multi-way valve with a fan-shaped flow channel sealing pair to measure production of an individual well to obtain the dynamic production data of an oil well. The multi-way valve with fan-shaped flow channel sealing pair includes a floating gating ring that is applied with contact specific pressure by an elastic component and an upper porous plane body form a gating plane sealing pair; a plurality of fan-shaped flow channel oil inlet holes are annularly and uniformly distributed on a mating surface of the upper porous plane body; the floating gating ring is configured such that it changes gradually from the upper fan-shaped flow channel to the lower round-shaped flow channel; and the inner part of the middle rotary spool is used as a public flow-guide passage.

5 Claims, 2 Drawing Sheets

MULTI-WAY VALVE WITH FAN-SHAPED FLOW CHANNEL SEALING PAIR

This application is the U.S. national phase of International Application No. PCT/CN2007/000888 filed 19 Mar. 2007 which designated the U.S. and claims priority to Chinese Patent Application No. 200620167076.4 filed 11 Dec. 2006, the entire contents of each of which are hereby incorporated by reference.

FIELD OF THE INVENTION

The present utility model relates to an oil-gas collection and transmission system for petroleum, chemistry industry and so on. A multi-way valve with fan-shaped flow channel sealing pair measures in turn the production of an individual well to obtain the dynamic production data of an oil well.

BACKGROUND ART

At present, the multi-way valve using in the oil industry mainly has two forms of the sealing pair, the plane sealing pair, for example, the Chinese Patent No. 200420006528.1, and the cylindrical sealing pair. The valve seat sealing ring of a rotary multi-way valve with cylindrical sealing pair is made from flexible materials. The wear compensation is provided by an elastic component during the working process. When the period of the abrasion amount for sealing is finished, it is necessary to stop for maintenance. Here, it is required to open one of the fluid pipe inlet flanges of the rotary multi-way valve with cylindrical sealing pair, to make the elastic component be pressed by a special adjusting tool and to make the valve seat sealing ring produce sealing specific pressure for restoring production. The structure character of a rotary multi-way valve with the plane sealing pair is that: a plurality of round cross-section flow channel oil inlets being uniformly distributed along the circumference on a plane and the sealing pair of the valve seat sealing ring is made from hard alloy materials. Thus it has such advantages as convenience in plane grinding processing, reliable sealing, and long working life. When the round cross-section flow channel oil inlets are in a larger size (such as 3", 4" or 5") and under high-level pressure, however, it means that a plurality of round cross-section flow channel oil inlets should be uniformly distributed along the larger circumference on a plane. This results in a larger size, thicker wall and higher price of the valve body. And the superiority of the plane sealing pair will be lost in the case of large size and high pressure. The present utility model is directed to keeping the advantages in the structure of a multi-way valve with the plane sealing pair while maintaining the size of the valve body to be substantially equivalent to that of the multi-way valve with the cylindrical sealing pair.

SUMMARY OF THE INVENTION

The structure of multi-way valve with fan-shaped flow channel sealing pair is disclosed in the present utility model. The multi-way valve with fan-shaped flow channel sealing pair is characterized in that: a floating gating ring that is applied with contact specific pressure by an elastic component and an upper porous plane body form a gating plane sealing pair. A plurality of fan-shaped flow channel oil inlet holes are annularly and uniformly distributed on the mating surface of the upper porous plane body. The inner part of the middle rotary spool is used as a public flow-guide passage. The floating gating ring is configured such that it changes gradually from the upper fan-shaped flow channel to the lower round-shaped flow channel. In order to realize the rotary gating for measurement, the inner public flow-guide metering passage of the middle rotary spool is in communication with a certain fan-shaped flow channel oil inlet hole located in the mating surface of the upper porous plane body when the middle rotary spool is rotated by electrical power or manual power to a certain angle. The floating gating ring is pre-exerted by an elastic force to make the sealing face self-sealed under a contact specific pressure. The present utility model has a compact structure. The flow channels are formed by casting. The sands carried in the fluid can not enter into the sealing face easily when the fluid flows down from the top to the bottom. The precise processing can be executed in the planar mechanism easily, thereby enabling a lower machining cost, reliable sealing and a longer working life.

The object of the present utility model is achieved by the followings: the multi-way valve with fan-shaped flow channel sealing pair comprises a metering outlet welding flange, a lower O-ring seal, a sliding support ring, a valve body, a middle rotary spool, a valve body O-ring seal, a sealing gasket, fluid inlet welding flanges, connecting bolt and nuts, an upper porous plane body, a connecting electric actuator intermediate flange, an internal hexagon adjusting fixing plate, an adjusting nut, a conical roller bearing, a shaft head O-ring seal, a porthole plug, a floating gating ring, a floating gating ring O-ring seal, an auxiliary sealing ring, an auxiliary sealing support ring, a bellow or dish-shaped spring, a seating ring socket head adjusting nut, a collection and transmission outlet welding flange etc. In order to realize the rotary gating for measurement, the inner public flow-guide metering passage of the rotary spool is in communication with a certain oil inlet hole located in the mating surface of the upper porous plane body when the rotary spool is rotated by electrical power or manual power to a certain angle.

Compared with the prior art, the present utility model has the following advantages: the floating gating ring that is applied with contact specific pressure by an elastic component and an upper porous plane body form a gating plane sealing pair, and a plurality of fan-shaped flow channel oil inlet holes are annularly and uniformly distributed on the mating surface of the upper porous plane body. In the large size and high pressure circumstances, the arrangement of this fan-shaped flow channel cross-section is more compact compared with the condition for arranging the round flow channel cross-section oil inlet holes in a circle. The diameter of the valve body is reduced by 15-40% and it is equivalent to the size of the cylindrical structure. The present utility model is directed to keeping the advantages in the structure of a multi-way valve with the plane sealing pair while maintaining the size of the valve body be substantially equivalent to that of the multi-way valve with the cylindrical sealing pair.

The floating gating ring is pre-exerted by an elastic force to make the sealing face self-sealed under a contact specific pressure. When the abrasion appears for the long time running, the plug can be opened and the seating ring socket head adjusting nut can be adjusted by a special tool. Therefore, the floating gating ring is applied a force by an elastic component. The fan-shaped flow channels are formed by precision casting. The floating gating ring is configured by precision casting such that it changes gradually from the upper fan-shaped flow channel to the lower round-shaped flow channel. The whole structure is formed so that the sands carried in the fluid can not enter into the sealing face easily when the fluid flows down from the top to the bottom. The planer sealing using the rotary sealing pair is more reliable with long service life at lower manufacture costs.

BRIEF DESCRIPTION OF THE DRAWINGS

The present utility model is further explained by the embodiment with reference to the accompanying drawings.

REFERENCE SIGNS

Figure 1:
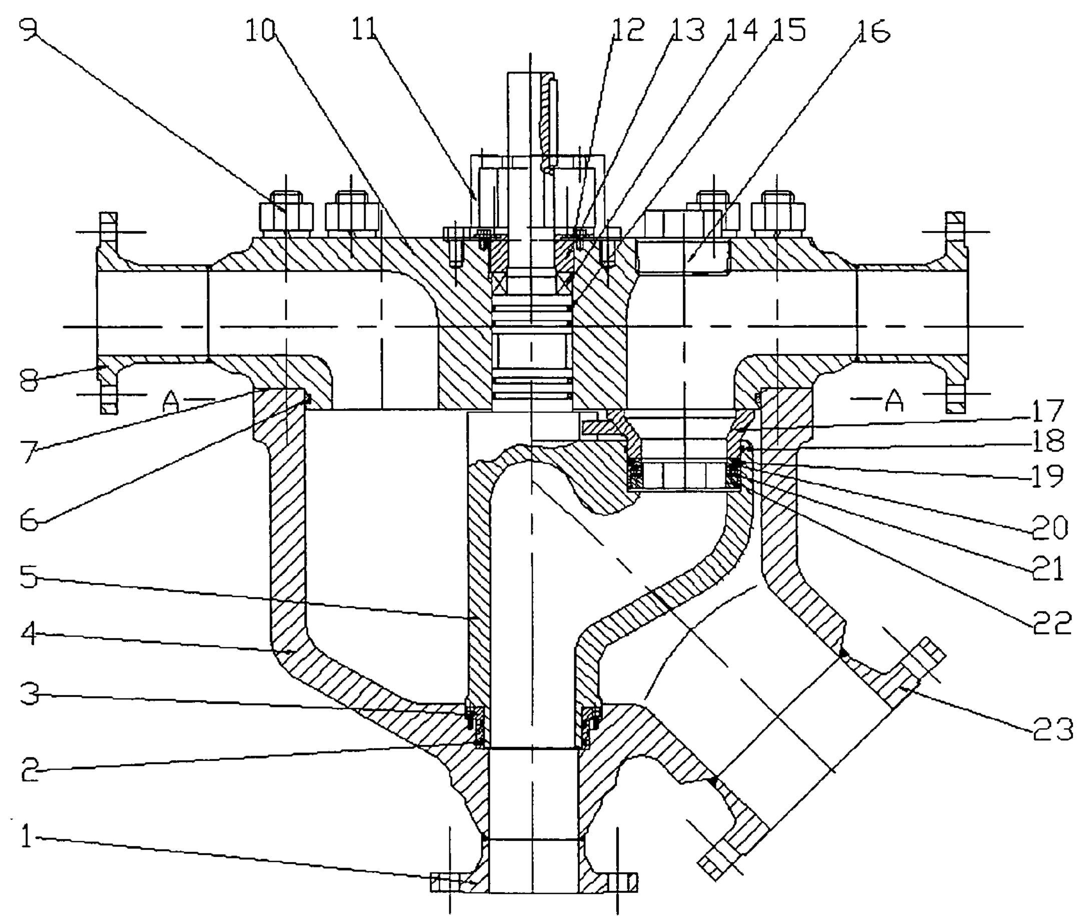
FIG. 1 is a schematic view of a multi-way valve with fan-shaped flow channel sealing pair according to the present utility model.

1. metering outlet welding flange
2. lower O-ring seal
3. sliding support ring
4. valve body
5. middle rotary spool
6. valve body O-ring seal
7. sealing gasket
8. fluid inlet welding flange
9. connecting bolt and nut
10. upper porous plane body
11. connecting electric actuator intermediate flange
12. internal hexagon adjusting fixing plate
13. adjusting nut
14. conical roller bearing
15. shaft head O-ring seal
16. porthole plug
17. floating gating ring
18. floating gating ring O-ring seal
19. auxiliary sealing ring
20. auxiliary sealing support ring
21. bellow or dish-shaped spring
22. seating ring socket head adjusting nut
23. collection and transmission outlet welding flange

DETAILED DESCRIPTION OF THE PREFERRED EMBODIMENTS

Figure 2:
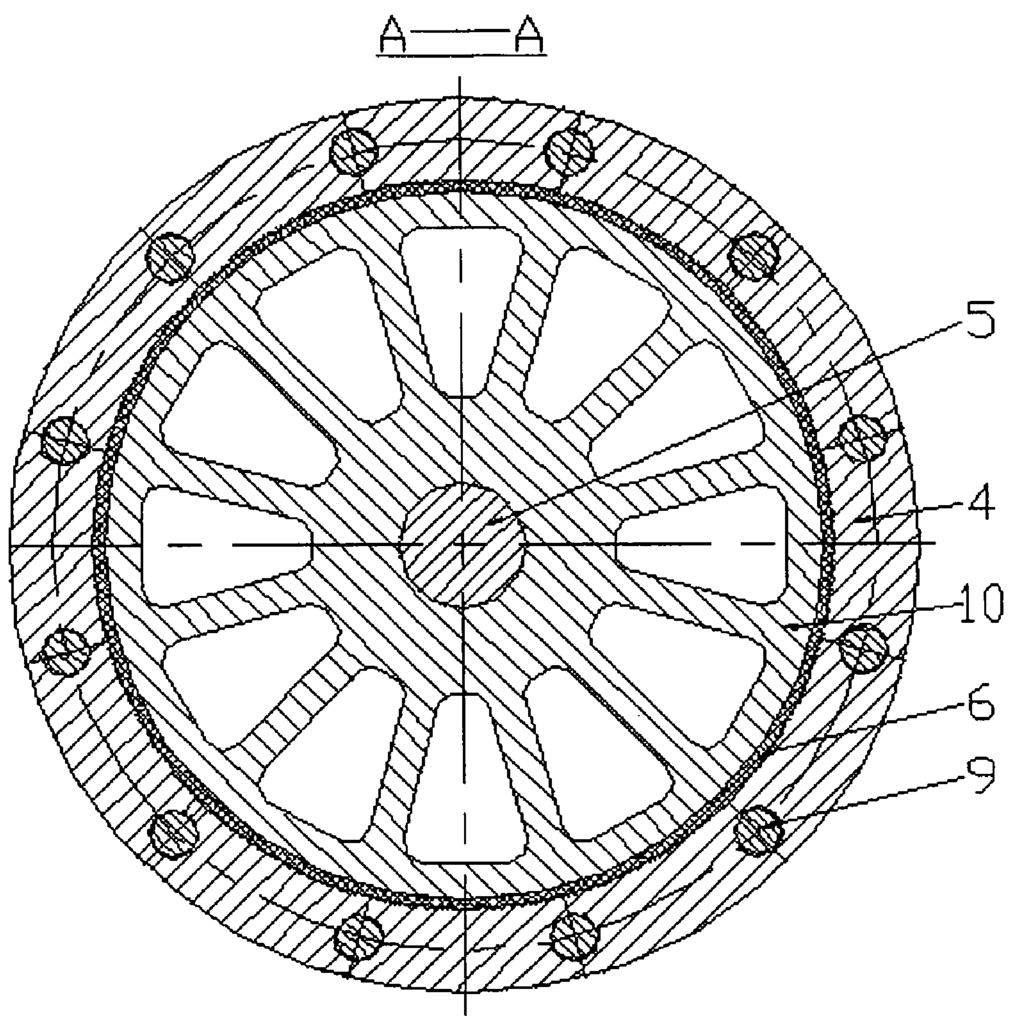
FIG. 2 is a sectional view of A-A of FIG. 1.

A preferred embodiment of a multi-way valve with fan-shaped flow channel sealing pair having twelve way in an individual well with inlet diameter DN100 mm, metering outlet diameter DN100 mm and a collection and transmission outlet diameter DN200 mm is described. With reference to FIG. 1, the valve body 4 is a cast. The dimension of the metering outlet welding flange 1 is the same as that of twelve individual well fluid inlet flanges 8 of DN100 mm, and the diameter of a collection and transmission outlet welding flange 23 is 200 mm. The metering outlet welding flange 1 and the collection and transmission outlet welding flange 23 are both butt welded onto the valve body 4. The upper porous plane body 10 is formed by precision cast. Twelve fluid inlet flow channels of an individual well with DN100 mm are configured such that they change gradually from horizontal round sections to fan-shaped flow channels in the vertical section when turning into 90° direction. As shown in FIG. 2, the area of fan-shaped sections is equal to that of the round horizontal sections. The mating surface of the upper porous plane body is processed by chromate treatment or is spraying welded with hard alloy, and followed by precisely planar grinding. The middle rotary spool 5 and a floating gating ring 17 are machined by casting. The floating gating ring 17 is configured such that it changes gradually from the upper fan-shaped flow channel to the lower round-shaped flow channel. The mating surface of the upper fan-shaped flow channel sealing pair of the floating gating ring 17 is spraying welded by hard alloy, and followed by precisely planar grinding. The floating gating ring 17 is welded with a positioning pin which is embedded into the middle rotary spool 5 to make the floating gating ring 17 rotate along with the middle rotary spool 5 all the time and to maintain the sealing aperture of the fan-shaped flow channel of the floating gating ring 17 in alignment with the mating seal aperture of one of twelve fan-shaped flow channels of the upper porous plane body 10.

The assembly process is as follows. The sliding support ring 3 with the lower O-ring seal 2 is first put into the mating seat of the valve body 4, and then the middle rotary spool 5 assembly is placed into the valve body 4. And the seating ring socket head adjusting nut 22 is screwed into the bottom of the valve seat of the middle rotary spool 5. After that, a bellow or dish-shaped spring 21, an auxiliary sealing support ring 20, an auxiliary sealing ring 19, a floating gating ring O-ring seal 18, the floating gating ring 17 are put in turn. Then the upper porous plane body 10 is connected to the valve body 4 by connecting bolt and nuts 9. A conical roller bearing 14 is placed and a adjusting nut 13 is screwed. An internal hexagon adjusting fixing plate 12 is put on the top of the adjusting nut 13. Stop screws are tightened, and a connecting electric actuator intermediate flange 11 is connected.

The contact seal specific pressure of the floating gating ring 17 is realized by the following steps: a special adjusting tool is put into the plug opening of the upper porous plane body 10 to adjust the seating ring socket head adjusting nut 22 so that the bellow or dish-shaped spring 21 is deformed under pressure. Then an elastic force is transmitted to the floating gating ring 17 by the auxiliary sealing ring 19 and the auxiliary sealing support ring 20 so that contact seal specific pressure is obtained by the floating gating ring 17.

The working process of the present utility model is as follows. The floating gating ring 17 is in alignment with a certain fan-shaped flow channel oil inlet hole located in the mating surface of the upper porous plane body 10 when the middle rotary spool 5 is rotated by electrical power or manual power to a certain angle, so that the inner public flow-guide metering passage of the middle rotary spool 5 is in communication with a certain fan-shaped flow channel oil inlet hole located in the mating surface of the upper porous plane body 10 and the rotary gating for measurement can be realized. The fluid from remaining fan-shaped flow channel fluid inlet holes of the upper porous plane body 10 is converged and enters into a collection and transmission passage through the collection and transmission outlet welding flange 23 mounted to the bottom side of valve body 4. By repeating the above-mentioned process, the individual well of an oil well can be measured in turn, and collection and transmission of oil and gas can be achieved.

The invention claimed is:

1. A multi-way valve with fan-shaped flow channel sealing pair comprising a metering outlet welding flange (1), a lower O-ring seal (2), a sliding support ring (3), a valve body (4), a middle rotary spool (5), a valve body O-ring seal (6), a sealing gasket (7), fluid inlet welding flanges (8), connecting bolt and nuts (9), an upper porous plane body (10), a connecting electric actuator intermediate flange (11), an internal hexagon adjusting fixing plate (12), an adjusting nut (13), a conical roller bearing (14), a shaft head O-ring seal (15), a porthole plug (16), a floating gating ring (17), a floating gating ring O-ring seal (18), an auxiliary sealing ring (19), an auxiliary sealing support ring (20), a bellow or dish-shaped spring (21), a seating ring socket head adjusting nut (22), a collection and transmission outlet welding flange (23) etc., the multi-way valve with fan-shaped flow channel sealing pair being characterized in that: the floating gating ring (17) that is applied with contact specific pressure by an elastic component and an upper porous plane body (10) form a gating plane sealing pair; a plurality of fan-shaped flow channel oil inlet holes are annularly and uniformly distributed on the mating surface of the upper porous plane body (10); the inner part of the middle rotary spool (5) is used as a public flow-guide passage; and the floating gating ring (17) is configured such that it changes gradually from the upper fan-shaped flow channel to the lower round-shaped flow channel.

2. The multi-way valve with fan-shaped flow channel sealing pair according to claim 1, characterized in that: an individual well fluid inlet flow channel of the upper porous plane body (10) are configured such that it changes gradually from horizontal round sections to fan-shaped flow channels in the vertical section when turning into 90° direction, wherein the area of fan-shaped sections is equal to that of the round horizontal sections.

3. The multi-way valve with fan-shaped flow channel sealing pair according to claim 1, characterized in that: the floating gating ring (17) is connected with a positioning pin which is embedded into the middle rotary spool (5) to make the floating gating ring (17) rotate along the middle rotary spool (5) all the time and to maintain the sealing aperture of the fan-shaped flow channel of the floating gating ring (17) in alignment with the mating seal aperture of one of the fan-shaped flow channels of the upper porous plane body (10).

4. The multi-way valve with fan-shaped flow channel sealing pair according to claim 1, characterized in that: the upper, lower and the radial moving clearances are adjusted to a suitable amount by turning the adjusting nut (13) from the outside of the multi-way valve to make it move down so that the force on the conical roller bearing (14) is transmitted to the middle rotary spool (5), then the internal hexagon adjusting fixing plate (12) is fixed.

5. The multi-way valve with fan-shaped flow channel sealing pair according to claim 1, characterized in that: after a porthole plug (16) is opened and the seating ring socket head adjusting nut (22) is adjusted by a special adjusting tool, the force is applied to the floating gating ring (17) by the elastic component.

* * * * *